United States Patent [19]

Oakes et al.

[11] 4,452,764

[45] Jun. 5, 1984

[54] BISMUTH INHIBITORS FOR ACID GAS CONDITIONING SOLUTIONS

[75] Inventors: Billy D. Oakes, Lake Jackson; Michael S. Dupart, Alvin, both of Tex.; David C. Cringle, Melbourne, Australia

[73] Assignee: The Dow Chemical Company, Midland, Mich.

[21] Appl. No.: 516,073

[22] Filed: Jul. 22, 1983

Related U.S. Application Data

[62] Division of Ser. No. 394,209, Jul. 1, 1982, Pat. No. 4,420,337.

[51] Int. Cl.$^3$ .............................................. B01D 53/34
[52] U.S. Cl. ..................................... 423/228; 423/229
[58] Field of Search .......................................... 423/228

[56] References Cited

U.S. PATENT DOCUMENTS

| | | | |
|---|---|---|---|
| 1,989,004 | 5/1931 | Life | 423/228 |
| 3,087,778 | 4/1963 | Negra | 252/387 |
| 3,959,170 | 5/1976 | Mago et al. | 423/228 |

Primary Examiner—John Kight, III
Assistant Examiner—Garnette D. Draper

[57] ABSTRACT

A corrosion inhibited composition containing an aqueous gas conditioning solution such as an alkanolamine with small amounts of soluble trivalent bismuth compounds. The compositions are useful to separate acid gases such as carbon dioxide from feed streams in gas conditioning apparatus with minimum amounts of corrosion of the stainless steel.

4 Claims, No Drawings

BISMUTH INHIBITORS FOR ACID GAS CONDITIONING SOLUTIONS

CROSS-REFERENCE TO RELATED APPLICATION

This is a divisional of application Ser. No. 394,209, filed July 1, 1982 now U.S. Pat. No. 4,420,337.

BACKGROUND OF THE INVENTION

This invention relates to alkanolamine corrosion inhibiting compositions containing bismuth salts for use in stainless steel acid gas removal equipment and methods for their use.

It is well known from the prior art that acid gases such as carbon dioxide, hydrogen sulfide and carbonyl sulfide can be removed from gaseous feed streams such as natural gas and synthesis gas using dilute aqueous solutions of potassium carbonate, alkanolamines such as monoethanolamine, diethanolamine, and methyl diethanolamine, and other weak bases. The usual procedure is to use a contactor wherein the absorbent solution contacts the feed stream and to use a regenerator with a reboiler wherein the rich absorbent containing the acid gas components is regenerated back to the free absorbent. The solution is then recycled back to the contactor for reuse.

There has been much activity devoted to solving the problem of metallic corrosion in the equipment used in the above process.

It is common practice to use stainless steel and nickel alloys in sensitive areas such as heat exchange equipment, regenerator trays and absorber trays.

U.S. Pat. No. 3,087,778 (Apr. 30, 1963) provides for inhibition of potassium carbonate solutions by using 1,000 to 5,000 p.p.m. of the trivalent oxides of arsenic, antimony or bismuth.

U.S. Pat. No. 3,808,140 (Apr. 30, 1974) provides for inhibition of alkanolamine solutions by using minor amounts of vanadium and antimony compounds.

U.S. Pat. No. 3,896,044 (July 22, 1975) provides for inhibition of alkanolamine solutions by using minor amounts of nitro substituted aromatic acids or salts thereof.

U.S. Pat. No. 3,959,170 (May 25, 1976) provides for inhibition of alkanolamine solutions using a minor amount of a stannous salt.

U.S. Pat. No. 4,071,470 (Jan. 31, 1978) provides for inhibition of alkanolamine solutions using a minor amount of the reaction product of copper, sulfur, and an alkanolamine.

U.S. Pat. No. 4,096,085 (June 20, 1978) provides for inhibition of alkanolamine solutions using minor amounts of a polyamine, with or without copper, and sulfur.

U.S. Pat. No. 4,100,099 (July 11, 1978) provides for inhibition of sour gas conditioning fluids using minor amounts of quaternary pyridinium salts and alkylene polyamines.

U.S. Pat. No. 4,100,100 (July 11, 1978) provides for inhibition of sour gas conditioning fluids using minor amounts of quaternary pyridinium salts, thiocyanate compounds of thioamide compounds, and divalent cobalt compounds.

U.S. Pat. No. 4,102,804 (July 25, 1978) provides for inhibition of sour gas conditioning solutions using minor amounts of a quaternary pyridinium salt, and a thiocyanate compound, a sulfide compound or a thioamide compound.

U.S. Pat. No. 4,116,629 (Sept. 26, 1978) provides for the corrosion inhibition of stainless steels (types 410 and 430) when in contact with carbonate solutions by using nickel salts.

U.S. Pat. No. 4,143,119 (Mar. 6, 1979) provides for inhibition of sour gas conditioning solutions using minor amounts of copper and a polysulfide generated in situ.

While the above compositions are effective, they each have various defects which detract from their universal use. For example, compounds of arsenic, antimony and vanadium are known to be toxic and their use presents waste disposal problems for the plant operators. The use of the quaternary pyridinium compounds are known to cause a foaming problem in certain instances.

SUMMARY OF THE INVENTION

It now has been discovered that the corrosion of stainless steel in gas removal equipment can be effectively reduced by using a gas conditioning solution inhibited by effective amounts of a soluble bismuth compound in the trivalent state.

The inhibitors are constantly replenished or maintained in the gas conditioning solution in order to obtain effective passivation.

The invention is a composition which comprises an aqueous alkanolamine solution and an corrosion effective amount of a soluble bismuth compound in the trivalent state, as well as a method of using the composition.

DETAILED DESCRIPTION OF THE INVENTION

The inhibitors of this invention are effective in aqueous solutions of alkanolamines, i.e., solutions containing 15 to 50 weight percent alkanolamines and 85 to 50 weight percent of water.

Alkanolamines which are useful in this invention are mono and polyalkanolamines having two to four carbon atoms in each alkanol group. Examples of these alkanolamines are monoethanolamine, diethanolamine, and monoisopropanolamine.

The impure gaseous hydrocarbons feed streams which can be treated with the inhibited gas conditioning solutions of this invention to remove carbon dioxide can contain trace amounts, i.e., 300 parts per million or less of hydrogen sulfide and/or carbonyl sulfide.

Examples of useful soluble trivalent bismuth compounds are bismuth nitrate, bismuth citrate, bismuth ammonium citrate, bismuth subcarbonate, bismuth halides such as the bromide, and chloride, bismuth hydroxide, bismuth subsalicylate, bismuth sulfate, bismuth acetate, bismuth benzoate, bismuth molybdate, bismuth tartrate, bismuth trioxide, and bismuth oxyhalides such as the fluoride, bromide, and chloride.

It is to be noted that the terms soluble compound means for the purpose of this invention that the compound is sufficiently soluble in the aqueous gas conditioning solution, i.e., aqueous alkanolamine to be useful herein.

It has been found that the bismuth inhibitors must be maintained in the gas conditioning solutions in amounts from 1.0 to 300 parts per million. Since these compounds are depleted during use, large amounts such as 400 or more p.p.m. can be used at start-up and periodic additions can be made thereafter to maintain the required effective amounts in the solution.

The preferred effective amount of the trivalent bismuth compounds can range from 1 to 200 p.p.m. and more preferably 5 to 25 p.p.m.

TESTING PROCEDURE

The effectiveness of the corrosion inhibitors of this invention were determined in a static coupon corrosion test. In this test a solution of 30 percent by weight of monoethanolamine and 70 percent deionized water was saturated with $CO_2$ to obtain a final solution containing 0.45 to 0.55 moles of $CO_2$ per mole of amine. This solution simulates a rich amine solution commonly found in gas conditioning plants.

About 350 ml of this solution with inhibitors is then placed in a 2″ by 10″ teflon-lined steel cylinder, prepared metal test coupons were inserted, and the cylinder was sealed and bolted shut.

The cylinder and its contents were then heated to 250° F. for 24 hours. The coupons were then removed, cleaned and weighed. The corrosion rate in mils per year (M.P.Y.) is calculated from the following equation $$M.P.Y. = \frac{(1.44/\text{metal density in gms/cm}^3)(\text{weight loss in mgs})}{(\text{surface area in dm}^2)(\text{time in days})}$$

In the manner set forth above, Table I gives the corrosion rate using 304 stainless steel coupons at 250° F. over a 24-hour period. The inhibitors used in these tests are listed therein.

Table I shows the dramatic decrease in the corrosion rates for stainless steel when using the inhibitors of this invention.

TABLE I

| RUNS | INHIBITOR | METAL CORROSION RATE-MPY 304SS |
|---|---|---|
| Control 1 | NONE | 11.6 |

TABLE I-continued

| RUNS | INHIBITOR | METAL CORROSION RATE-MPY 304SS |
|---|---|---|
| Example | | |
| 1 | 1 ppm $Bi^{+3}$ (citrate) | 0.53 |
| 2 | 3 ppm $Bi^{+3}$ (subsalicylate) | 0.73 |
| 3 | 4 ppm $Bi^{+3}$ (ammonium citrate) | 0.37 |
| 4 | 5 ppm $Bi^{+3}$ (citrate) | 0.5 |
| 5 | 10 ppm $Bi^{+3}$ (subcarbonate) | 0.9 |
| 6 | 10 ppm $Bi^{+3}$ (citrate) | 0.80 |
| 7 | 12 ppm $Bi^{+3}$ (subgallate) | 1.06 |
| 8 | 14 ppm $Bi^{+3}$ (subsalicylate) | 0.66 |
| 9 | 15 ppm $Bi^{+3}$ (citrate) | 0.53 |
| 10 | 20 ppm $Bi^{+3}$ (citrate) | 0.33 |
| 11 | 25 ppm $Bi^{+3}$ (nitrate) | 0.55 |
| 12 | 25 ppm $Bi^{+3}$ (nitrate) | 0.43 |
| 13 | 30 ppm $Bi^{+3}$ (subcarbonate) | 0.33 |
| 14 | 50 ppm $Bi^{+3}$ (nitrate) | 0.6 |
| 15 | 75 ppm $Bi^{+3}$ (nitrate) | 0.6 |
| 16 | 100 ppm $Bi^{+3}$ (nitrate) | 0.55 |
| 17 | 200 ppm $Bi^{+3}$ (citrate) | 0.17 |

We claim:

1. In the method of separating acid gases such as carbon dioxide from a gaseous feed stream containing said acid gases by contacting said gaseous stream with an aqueous alkanolamine solution followed by regeneration of said solution the improvement which comprises inhibiting the corrosion of stainless steel equipment used therein by maintaining in said solution, a corrosion inhibiting amount of one or more soluble trivalent bismuth compounds.

2. The method as set forth in claim 1 wherein the amount of said bismuth compounds is in the range from 1 to 300 parts per million.

3. A method for inhibiting corrosion of stainless steel surfaces by aqueous alkanolamine solutions containing at least 10 percent by weight of alkanolamines and containing dissolved acid gases such as carbon dioxide and trace amounts of hydrogen sulfide which comprises maintaining in said solution a corrosion inhibiting amount of one or more soluble trivalent bismuth compounds.

4. The method as set forth in claim 3 wherein the amount of said bismuth compounds is in the range from 1 to 300 parts per million.

* * * * *